Patented Aug. 20, 1935

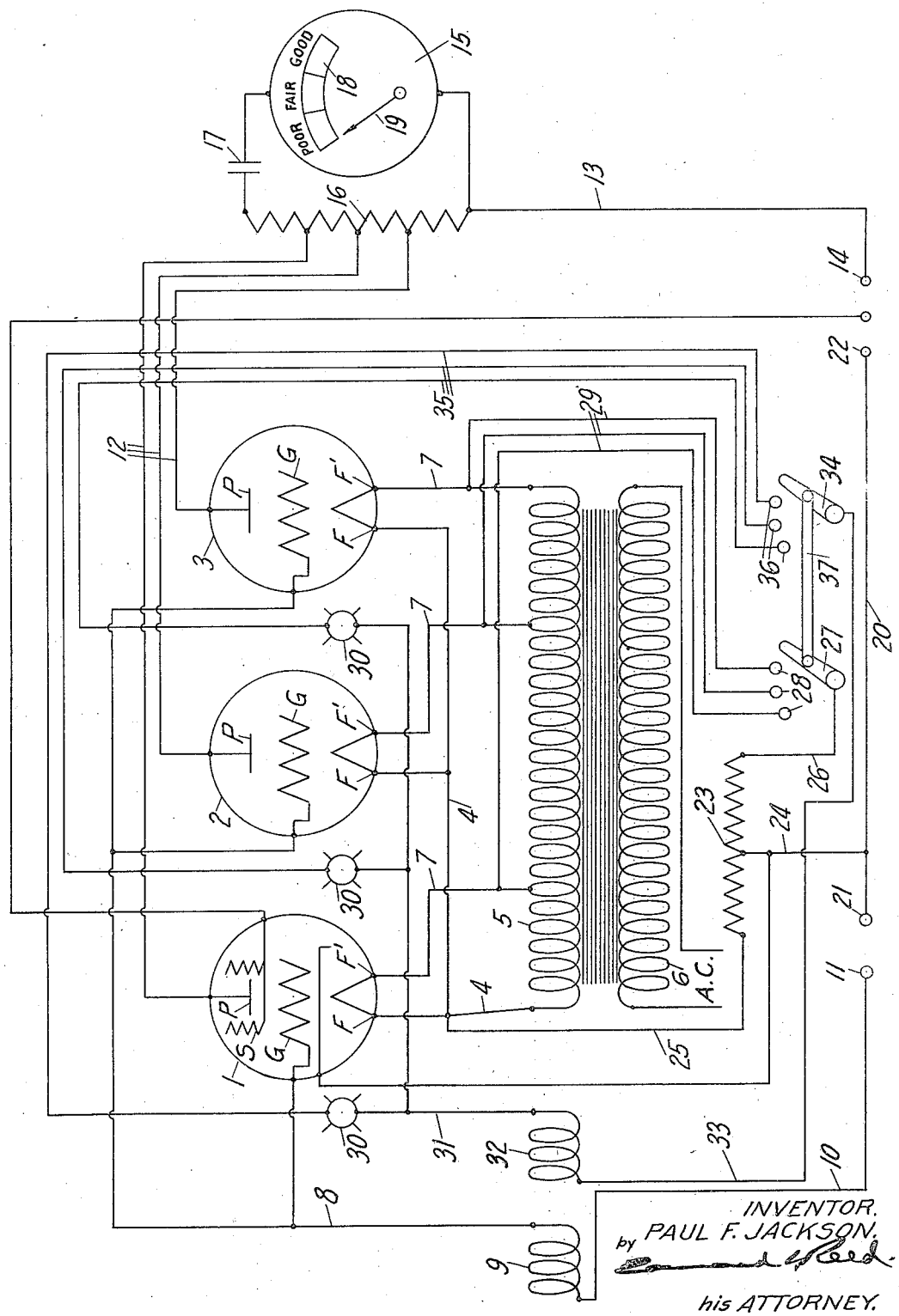

2,012,045

UNITED STATES PATENT OFFICE 2,012,045

APPARATUS FOR TESTING AUDION TUBES

Paul F. Jackson, Dayton, Ohio, assignor to The Radio Products Company, Dayton, Ohio, a corporation of Ohio Application July 30, 1931, Serial No. 554,042

9 Claims. (Cl. 250—27)

This invention relates to an apparatus for testing audion tubes, such as are commonly used in radio receiving sets, and more particularly to an apparatus adapted to test tubes of a large number of different types. In tube testing apparatus of this kind the indicating device usually consists of a milliammeter, the scale of which is graduated in amperes or other units to indicate the quantity of current in a plate circuit. The normal plate current differs in tubes of different types and the amount of current which would indicate that a tube of one type was of high value might also indicate that a tube of another type was of little or no value. Consequently in order to interpret the reading on such an apparatus the operator must be so familiar with the various types of tubes undergoing test that he knows the normal value of the plate current in each type of tube. The reading on such an apparatus means nothing to the novice or to a purchaser of tubes who is not skilled in such matters.

One object of the present invention is to provide an apparatus of this kind which will indicate the value of the plate current in terms of tube quality which will be understandable to any observer whether skilled or unskilled in this art.

A further object of the invention is to provide such an apparatus in which the same quality in any tube tested thereon will be indicated by the same designation regardless of the type of tube.

Testing apparatus of this kind is often provided with a large number of tube sockets which are marked with numbers or other indications to designate the type of tube which they are adapted to receive and the selecting device, for selecting the socket adapted to receive the particular tube which is to be tested, is likewise marked, and in the operation of the device it is necessary first to set the selecting device and to then locate the particular socket which is to receive the tube. To facilitate this operation it is a further object of the invention to provide means controlled by the selecting device to indicate the socket selected.

Other objects of the invention will appear as the apparatus is described in detail.

The accompanying drawing is a diagram of the circuits for an apparatus embodying my invention.

In this drawing I have illustrated one embodiment of the invention but it will be understood that this particular embodiment has been chosen for the purposes of illustration only and that the apparatus may take various forms without departing from the spirit of the invention. Apparatus of this kind usually contains a large number of sockets, frequently twenty-five or more, and for the purpose of simplifying the illustration I have shown the present apparatus as having but three sockets but it will be obvious that any desired number of sockets may be utilized by adding the necessary circuits.

The three sockets here illustrated are indicated at 1, 2 and 3 and each comprises two filament terminals F and F', a grid terminal G and a plate terminal P. The tube 1 also includes a screen S. These terminals may be supplied with current in the usual or any suitable manner and, in the present instance the filament terminals F are connected by a conductor 4 with one end of the secondary winding 5 of a transformer, the primary winding 6 of which is adapted to be connected with a suitable source of supply for alternating current and is usually provided with means whereby it may be plugged in an ordinary light socket. The filament terminals F' of the several sockets are connected by conductors 7 with the secondary 5 at various distances from that end of the secondary which is connected with the filament F, the points of connection being determined by the characteristics of the tubes which are to be tested in the respective sockets. The grid is connected by a conductor 8 with one end of a second secondary winding 9, the other end of which is connected with a conductor 10 which leads to a terminal 11 adapted to be connected with a source of current, or bias supply, of any suitable character, such as a battery. The plates P are connected by individual conductors 12 with a conductor 13 leading to a terminal 14 adapted to be connected with a source of current supply for the plate circuits, such as a battery. Interposed in the plate circuits, and preferably between the conductor 13 and the individual conductors 12, is an indicating device, such as a milliammeter 15, which contains the usual resistance 16 with which the individual conductors 12 are connected at such points as are determined by the characteristics of the tubes to be tested in the respective sockets. When using an alternating current milliammeter, as in the present case, I prefer to interpose a condenser 17 between the milliammeter and the plate terminals to prevent the passage of direct current without interfering with the passage of alternating current. The meter is provided with a scale 18 which is marked in terms of tube quality. Any suitable mark may be used which will designate the several qualities it is desired to indicate and, in the present instance, the scale is divided into three parts marked respectively, "good", "fair" and "poor".

and the pointer 19 moves over this scale when current is passed through the meter.

Selective means are provided for connecting the electrical center of the filament terminals of the socket in which the tube is to be tested with a source of current and, in the present arrangement, a conductor 20 is connected with terminals 21 and 22 which are adapted to be connected respectively with the source of grid current and the source of plate current. A resistance 23 is connected at its center with a conductor 24 leading to the conductor 20. One end of this resistance is connected by a conductor 25 with the filament terminals F of the several sockets. The other end of the resistance is connected by a conductor 26 with the movable contact member 27 of a selecting switch. This switch also comprises a series of stationary contacts, one for each socket, and these stationary contacts are connected, respectively, by conductors 29 with the filament terminals F' of the several sockets. In operating the device it is only necessary to move the movable switch member 27 into engagement with the stationary contact 28 for the socket in which the tube is to be tested, the several stationary contacts being marked by numbers, or otherwise, to indicate the type of tube which is to be tested in each socket. The tube is then placed in the socket and the plate current passing through the meter, and a part of the resistance 16, will cause the pointer to be moved to a position to indicate the quality of the tube. If the plate current is normal the pointer will move to the designation "good". If the plate current is so far below normal that the tube is of little or no value the pointer will indicate the designation "poor", and if the plate current is below normal and is still sufficient for operation the pointer will indicate the designation "fair".

Associated with each socket is an electrical indicating device, which is preferably in the form of a lamp 30, and means are provided under the control of the selecting switch 27—28 to close the circuit through the lamp associated with that socket which has been selected by the selecting device. As there shown, the several lamps are connected by a conductor 31 with one end of a separate secondary transformer winding 32, the other end of which is connected by a conductor 33 with the movable member 34 of a second switch. The other side of each lamp is connected by a conductor 35 with the respective stationary contacts 36 of the second switch. The movable switch member 34 is so connected with the movable switch member 27 that it will be caused to move in unison therewith, as by an insulated link 37. The arrangement of the stationary contacts is such that when the movable switch members are actuated the switch member 34 will close the circuit through that lamp which is associated with the socket which has been selected by the switch member 27, thus causing a light to show at that socket and indicating to the operator the particular socket in which the tube is to be placed.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a tube testing apparatus, a plurality of tube sockets adapted to receive tubes of different types, means for supplying current to the plate, grid and filament terminals of the several sockets, an indicating device interposed in the plate circuits and having a scale marked in terms of tube quality, a resistance connected in shunt across the terminals of said indicating device, the several sockets having their plate terminals connected at points in said resistance determined by the character of the tubes which the respective sockets are adapted to receive, whereby any tube inserted in its socket will cause the same indication on said indicating device that will be caused by another tube of different type but of the same quality inserted in its socket.

2. In a tube testing apparatus, a plurality of tube sockets adapted to receive tubes of different types, means for supplying current to the plate, grid and filament terminals of the several sockets, an indicating device connected with a source of current and having a scale marked in terms of tube quality, a resistance connected in shunt across the terminals of said indicating device means for connecting the plate terminals of the respective sockets in said resistance at points determined by the character of the tubes which the respective sockets are adapted to receive and selective means for connecting the electrical center of the filament terminals of each socket with a source of current.

3. In a tube testing apparatus, a plurality of tube sockets adapted to receive tubes of different types, means for supplying current to the plate, grid and filament terminals of the several sockets, an indicating device interposed in the plate circuits and having a scale marked in terms of tube quality, a resistance connected in shunt across the terminals of said indicating device the several sockets having their plate terminals connected at points in said resistance determined by the character of the tubes which the respective sockets are adapted to receive, a resistance connected at its center with a source of current supply, and connected at one end with one filament terminal of each socket, and selective means for connecting the other end of the last mentioned resistance with the other filament terminal of each socket.

4. In a tube testing apparatus, an indicating device having a scale marked in terms descriptive of tube quality, a resistance connected in shunt across the terminals of said indicating device a plurality of tube sockets adapted to receive tubes of different types and having their plate terminals connected at points in said resistance determined by the character of the tubes which the respective sockets are adapted to receive, means for supplying current to the plate, grid and filament terminals of said sockets, and means for connecting the electrical center of the filament terminals of each of said tube sockets with the source of current supply.

5. In a tube testing apparatus, a plurality of tube sockets adapted to receive tubes of different types, means for supplying current to the plate, grid and filament terminals of the several sockets, an indicating device interposed in the plate circuits and having a scale marked in terms of tube quality, a resistance connected in shunt across the terminals of said indicating device the several sockets having their plate terminals connected at points in said resistance determined by the character of the tubes which the respective sockets are adapted to receive, a switch having stationary contacts connected respectively with one filament terminal of each socket, and having a contact member movable successively into engagement with said stationary contacts, a resistance connected at separated points with said movable switch member and with the other filament terminal of each socket, and means for connecting the last mentioned resistance between the first mentioned points of connection with a source of current.

6. In a tube testing apparatus, a plurality of tube sockets adapted to receive tubes of different types, means for supplying current to the plate, grid and filament terminals of the several sockets, an indicating device interposed in the plate circuits and having a scale marked in terms of tube quality, a resistance connected in shunt across the terminals of said indicating device the several sockets having their plate terminals connected at points in said resistance determined by the character of the tubes which the respective sockets are adapted to receive, selective means for connecting the electrical center of the filament terminals of the respective sockets with a source of current, and means controlled by said selective means for indicating the selected socket.

7. In a tube testing apparatus, a plurality of tube sockets adapted to receive tubes of different types, means for supplying current to the plate, grid and filament terminals of the several sockets, an indicating device interposed in the plate circuits and having a scale marked in terms of tube quality, a resistance connected in shunt across the terminals of said indicating device the several sockets having their plate terminals connected at points in said resistance determined by the character of the tubes which the respective sockets are adapted to receive, a switch having stationary contacts connected respectively with one filament terminal of each socket, and having a contact member movable successively into engagement with said stationary contacts, a resistance connected at separated points with said movable switch member and with the other filament terminal of each socket, means for connecting the last mentioned resistance between the first mentioned points of connection with a source of current, an electrical indicating device associated with each socket, and means controlled by said switch for selectively energizing the last mentioned indicating devices.

8. In a tube testing apparatus, a plurality of tube sockets adapted to receive tubes of different types, means for supplying current to the plate, grid and filament terminals of the several sockets, an indicating device interposed in the plate circuits and having a scale marked in terms of tube quality, a resistance connected in shunt across the terminals of said indicating device the several sockets having their plate terminals connected at points in said resistance determined by the character of the tubes which the respective sockets are adapted to receive, a switch having stationary contacts connected respectively with one filament terminal of each socket, and having a contact member movable successively into engagement with said stationary contacts, a resistance connected at separated points with said movable switch member and with the other filament terminal of each socket, means for connecting the last mentioned resistance between the first mentioned points of connection with a source of current, lamps associated with the respective sockets and each having a circuit, a switch interposed in the lamp circuits and having separate contacts connected with the respective lamp circuits and a movable contact member to successively engage said separate contacts, and an operative connection between the movable members of the two switches.

9. In a tube testing apparatus, a plurality of tube sockets adapted to receive tubes of different types, means for supplying current to the plate, grid and filament terminals of the several sockets, an indicating device, and a resistance connected in shunt across the terminals of said indicating device, the several sockets having their plate circuits connected at points in said resistance determined by the character of the tubes which the respective sockets are adapted to receive.

PAUL F. JACKSON.